US008678151B2

United States Patent
Takei et al.

(10) Patent No.: US 8,678,151 B2
(45) Date of Patent: Mar. 25, 2014

(54) FLOW RATE CONTROL VALVE FOR CLUTCH CONTROL DEVICE

(75) Inventors: Yoshihiro Takei, Kanagawa (JP); Yasushi Yamamoto, Kanagawa (JP); Hiroyuki Kawanishi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 312 days.

(21) Appl. No.: 12/998,117

(22) PCT Filed: Sep. 16, 2009

(86) PCT No.: PCT/JP2009/066137
§ 371 (c)(1),
(2), (4) Date: Mar. 18, 2011

(87) PCT Pub. No.: WO2010/032741
PCT Pub. Date: Mar. 25, 2010

(65) Prior Publication Data
US 2011/0168516 A1    Jul. 14, 2011

(30) Foreign Application Priority Data
Sep. 19, 2008   (JP) ................................. 2008-240531

(51) Int. Cl.
*F16D 25/08* (2006.01)
*F16D 48/06* (2006.01)

(52) U.S. Cl.
USPC .................... 192/3.58; 192/85.63; 192/220.1; 701/68

(58) Field of Classification Search
None
See application file for complete search history.

(56) References Cited

U.S. PATENT DOCUMENTS

| 7,004,128 | B2 |   | 2/2006 | Majima et al. |
|-----------|-----|---|--------|---------------|
| 8,380,411 | B2  | * | 2/2013 | Takei et al. ................. 701/68 |
| 2010/0006045 | A1 |   | 1/2010 | Nakano et al. |

FOREIGN PATENT DOCUMENTS

| JP | 2-97731 A | 4/1990 |
|----|-----------|--------|
| JP | 11-108081 A | 4/1999 |
| JP | 2000-104572 A | 4/2000 |
| JP | 2000-337543 A | 12/2000 |
| JP | 2002-286057 A | 10/2002 |
| JP | 3417823 B2 | 4/2003 |
| JP | 2003-336529 A | 11/2003 |
| JP | 2008-115729(A) | 5/2008 |
| JP | 2008-175165 A | 7/2008 |
| WO | WO2008/078188 | * 7/2008 |

OTHER PUBLICATIONS

Machine language translation of applicant cited Japanese patent reference JP 2000-104572 (Nov. 4, 2000), From STIC translation.*
Machine language translation of applicant cited Japanese patent reference JP 2000-337543 (May 12, 2000) From STIC translation.*
Japanese Office Action dated Dec. 3, 2013.

* cited by examiner

*Primary Examiner* — David D Le
*Assistant Examiner* — Mark Manley
(74) *Attorney, Agent, or Firm* — McGinn Intellectual Property Law Group, PLLC

(57) ABSTRACT

A clutch control device for controlling a clutch installed between an engine and a transmission in a power transmission device for a vehicle includes a clutch actuator driven by a working fluid, a stroke sensor for detecting a movement of the clutch actuator, a flow rate control valve for controlling an amount of the working fluid in the clutch actuator, and a flow rate control valve control device for controlling a position of a valve body of the flow rate control valve responsive to a detection signal from the stroke sensor.

8 Claims, 12 Drawing Sheets

Fig. 7
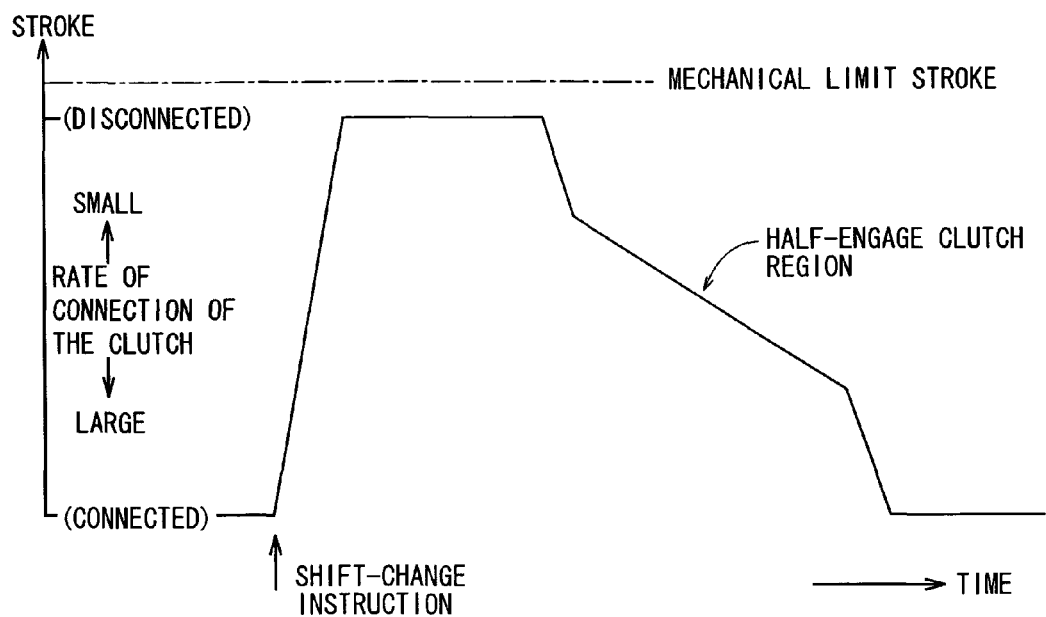
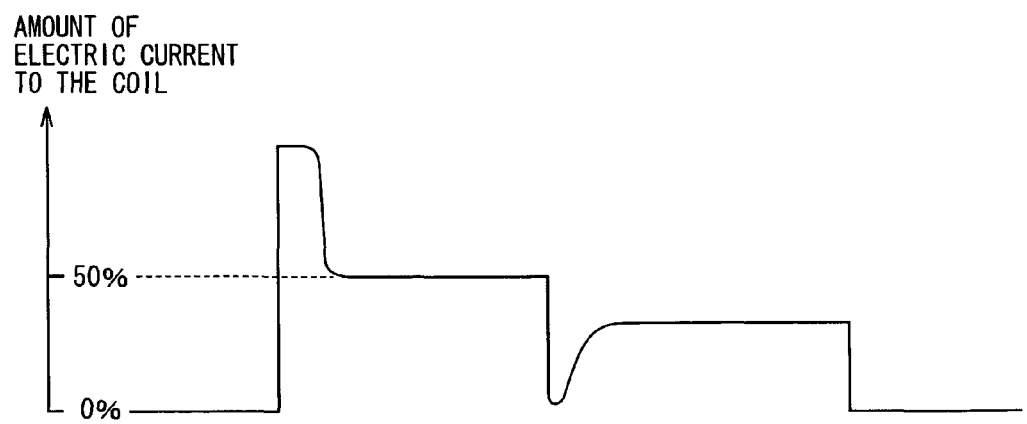

FLOW RATE CONTROL VALVE FOR CLUTCH CONTROL DEVICE

TECHNICAL FIELD

This invention relates to a flow rate control valve for controlling the working fluid in a clutch actuator in a clutch control device which automatically connects and disconnects a clutch provided in a vehicle by using a clutch actuator.

BACKGROUND ART

For easy driving of a vehicle and for reducing fatigue to the driver, various kinds of power transmission devices for vehicles have, in recent years, been widely used for easy driving. A representative example will be a so-called automatic transmission (AT) combining a torque converter and a planetary gear device together. A power transmission device which uses a transmission of the type of parallel shaft gear mechanism similar to the so-called manual transmission, in combination with an automatic clutch, is one of such automatic power transmission devices for vehicles. In this power transmission device, a clutch disposed between an engine and a transmission is provided with a clutch actuator, and the clutch is automatically connected or disconnected at the time when the driver changes the speed by shifting the gear by using a shift lever or at the start of the vehicle eliminating the need of operating the clutch pedal by the driver. There has been further proposed a power transmission device which automatically shifts the gear depending upon the traveling condition of the vehicle by using an electronically controlled device obviating the need of operating the shift lever by the driver.

A clutch (dry type single disk clutch) installed between an engine and a transmission is provided with a clutch disk 101 which has a friction disk fixed to the peripheral portion thereof as shown in FIG. 6. The clutch is slidably fitted by spline to a transmission input shaft 103 rotatably supported by a crankshaft 102 of the engine. A pressure plate 105 is provided on the back of the friction disk of the clutch disk 101 to bring the friction disk into pressed contact with a flywheel 104 at the rear end of the crankshaft 102. Further, a diaphragm spring 107 is attached to a clutch cover 106 that is fixed to the flywheel 104. When the vehicle is normally traveling, the diaphragm spring 107 brings the clutch disk 101 into pressed contact with the flywheel 104 via the pressure plate 105 and, therefore, the engine power is transmitted to the transmission input shaft 103 via the clutch disk 101.

The clutch is equipped with an operation mechanism for connecting and disconnecting the transmission of power, and the operation mechanism is constituted by a release bearing 108, a release fork 109, a clutch actuator 110 and the like. The clutch actuator 110 is a fluid pressure cylinder operated by a pneumatic pressure or a hydraulic pressure, and its piston is coupled to one end of the release fork 109. Provision is, further, made of a stopper 111 for mechanically limiting the movement in order to prevent the occurrence of damage to the clutch actuator 110 and the like caused by excessively large movement of the piston.

At the time of cutting off the engine power for shifting the gear of the transmission, the working fluid is fed to the clutch actuator 110 to displace one end of the release fork 109 toward the right in the drawing. The other end of the release fork 109 displaces toward the opposite direction, causing the release bearing 108 coming in contact therewith to slide leftward so that the diaphragm spring 107 moves as represented by a two-dot chain line in the drawing. Therefore, the spring force that pushes the pressure plate 105 is released, and the transmission of the engine power to the transmission input shaft 103 is cut off. To connect the clutch again after having finished the gear shift, the working fluid in the clutch actuator 110 is discharged, and the release fork 109 is moved leftward by a return spring 112 or the like. The state of connecting the clutch (rate of connection) is determined by the movement of the piston of the clutch actuator 110, i.e., by the stroke of the clutch actuator.

At the time of gear shifting, the clutch must be disconnected and connected quickly without causing shift shock. Therefore, at the time of connecting again the clutch that is once disconnected after having shifted the gear (after the gears are engaged), the piston of the clutch actuator 110 is, first, quickly moved in a direction of connection so as to quickly pass through an invalid region where the torque is not substantially transmitted, and the rate of connection is gradually increased in the so-called half-engage clutch region where the torque starts transmitting in order to avoid the shift shock caused by a sharp increase in the rate of connection as illustrated in a graph of FIG. 7 that shows changes in the stroke. The above control is executed by varying the amount of the working fluid in the clutch actuator 110 to correctly control the stroke thereof.

A clutch control device which automatically connects and disconnects the clutch at the time of gear shifting is provided with a working fluid pressure source such as an air tank that feeds the working fluid, a stroke sensor for detecting the movement of the piston of the clutch actuator, and control valves for controlling the amount of the working fluid in the clutch actuator. The clutch control device executes the clutch control at the time of gear shifting. Usually, the control valves are arranged in the working fluid feed pipe and in the discharge pipe, respectively. The rate of connection of the clutch is controlled by opening and closing these two control valves. There has also been known a clutch control device which feeds and discharges the working fluid in the clutch actuator by using a single flow rate control valve as disclosed in, for example, Japanese Patent No. 3417823.

In the clutch control device that uses a single flow rate control valve as shown in a circuit diagram of FIG. 8, the flow rate control valve 1 is connected to a communication passage 2 communicated with the clutch actuator 110, to a pressure source passage 4 communicated with the working fluid pressure source 3 such as an air tank, and to a discharge passage 5 for discharging the working fluid from the clutch actuator 110 and, further, includes three ports, i.e., a communication port 2p, a pressure source port 4p and a discharge port 5p formed therein and opened to the respective passages.

The flow rate control valve 1 of FIG. 8 is a proportional control valve of the type of slide valve equipped with a drive device of the type of electromagnetic solenoid, and works as a valve actuator for operating a valve body 6. Namely, the flow control valve 1 has such flow rate characteristics that the flow rate of the working fluid that flows therethrough varies depending upon the position of the valve body 6. The amount of electric current flowing into the electromagnetic solenoid serves as an operation amount for varying the flow rate. To control the stroke of the clutch, a flow rate control valve control device 9 is connected to the flow rate control valve 1 to control the amount of electric current to a coil 8 responsive to a detection signal from a stroke sensor 7.

As shown in detail in the operation view of FIG. 9, the valve body 6 of the flow rate control valve 1 has two lands on the way thereof, one end of the valve body 6 being coupled to a moving yoke 10 of the electromagnetic solenoid. A spring 11 is arranged at the other end of the valve body 6, and the position of the valve body 1 is determined by a balance between the magnetic force acting on the moving yoke 10 and the resilient force of the spring 11. When the flow of current to the coil 8 is interrupted (amount of current, 0%), the valve body 6 is pushed by the spring 11 and assumes a position shown in FIG. 9(b) whereby the communication port 2p communicates with the discharge port 5p, and the working fluid in the clutch actuator 110 is discharged to the exterior permitting the clutch to be connected. If the electric current flowing into the coil 8 assumes a maximum value (100%), the valve body 6 is brought to a position shown in FIG. 9(c) compressing the spring 11, and the communication port 2p communicates with the pressure source port 4p. Therefore, the working fluid in the pressure source 3 is introduced into the clutch actuator 110 through the communication port 2p, and the clutch is disconnected. When a 50%-current flows into the coil 8, the valve body 6 is brought to a position of FIG. 9(a), i.e., brought to the neutral position, and the communication port 2p is cut off from the power source port 4p and the discharge port 5p; i.e., the stroke of the clutch is maintained at a predetermined position. To control the stroke of the clutch at the time of gear shifting as shown in FIG. 7, the amount of electric current flowing into the coil is so controlled as to vary according to a pattern shown on the lower side in FIG. 7.

Here, described below is a relationship between the position of the valve body of the flow rate control valve and the flow rate. In the flow rate control valve in which the length L of the land is the same as the width W of the communication port 2p, the working fluid readily starts flowing if the valve body is deviated toward the right or the left from the neutral position in FIG. 9(a). The flow rate control valve has only one neutral position at which the flow rate becomes 0, and has flow rate characteristics as represented by a two-dot chain line in FIG. 11, i.e., flow rate characteristics that are symmetrical on the feed side and on the discharge side with the neutral position (amount of current, 50%) as a center. When the above flow rate control valve is used, the amount of the working fluid in the clutch actuator 11 readily varies if deviated from the neutral position. To maintain the stroke at a predetermined position, therefore, it becomes necessary to accurately control the electric current that flows into the coil 8.

On the other hand, if the length L of the land is set to be larger than the width W of the communication port 2p by only a small amount as shown in FIG. 10(a), then a small width is imparted to the neutral position of the flow rate control valve 1. In this case, the flow rate characteristics become as represented by a solid line in FIG. 11, the neutral position includes an dead zone DZ where the flow rate does not change despite the operation amount is varied, and the flow rate becomes symmetrical on the feed side and on the discharge side relative to the central point. Therefore, despite the electric current varies to some extent due to disturbance or the like while the electric current flowing into the coil 8 has been so set as to maintain the stroke at the predetermined position, the stroke does not vary and a stable operation is realized. The dead zone DZ of the flow rate control valve 1 may also occur due to unavoidable error during the production in the step of producing the flow rate control valves.

In the flow rate control valve which includes the dead zone DZ, the position where the valve body 6 is brought to a halt so as to maintain a predetermined stroke while the stroke of the clutch is being controlled, varies in the direction in which the valve body 6 moves. When the valve body 6 moves toward the right in FIG. 10 to arrive at the neutral position, i.e., when the working fluid is fed to the clutch actuator 110 to operate the clutch in the direction of disconnection (stroke increases) and, thereafter, the valve body 6 is brought to the neutral position to cut off the feed, the valve body 6 stops at a position of FIG. 10(b)(corresponds to a point P in FIG. 11) where the right end of the land of the valve body 6 closes the communication port 2p. Conversely, when the valve body 6 moves toward the right in FIG. 10 to arrive at the neutral position, i.e., when the working fluid is discharged from the clutch actuator 110 to operate the clutch in the direction of connection (stroke decreases) and, thereafter, the valve body 6 is brought to the neutral position to stop the discharge, the valve body 6 stops at a position of FIG. 10(b)(corresponds to a point N in FIG. 11) where the left end of the land of the valve body 6 closes the communication port 2p.

PRIOR ART DOCUMENT

Patent Document

Patent document 1: Japanese Patent No. 3417823

OUTLINE OF THE INVENTION

Problems that the Present Invention is to Solve

In order to correctly control the rate of connection of the clutch, it is required to quickly and correctly control the amount of working fluid in the clutch actuator by using the flow rate control valves. For this purpose, the flow rate control valve control device is storing flow rate characteristics representing a relationship between the amount of electric current to the coil of the electromagnetic solenoid and the flow rate (FIG. 11). For example, when there is an dead zone at the neutral position in the flow rate characteristics, the flow rate characteristics are stored in the form of a graph represented by a solid line in FIG. 11. By using the flow rate characteristics, the flow rate control valve control device controls the amount of electric current flowing into the coil so that the amount of electric current that represents the operation amount assumes a value that corresponds to a target flow rate.

Here, however, the individual flow rate control valves differ to some extent due to slight difference in the production process, and their flow rate characteristics representing the relationship between the amount of electric current and the flow rate differ to a slight degree depending upon the individual flow rate control valves. Further, even the same flow rate control valve may undergo a change in the flow rate characteristics due to secular change. As for a flow rate control valve in which an dead zone is present, a balance between the magnetic force of the electromagnetic solenoid and the spring may change due to secular change. In case the magnetic force has decreased, the solid line representing the flow rate characteristics in FIG. 12 moves toward the right (broken line X). In case the force of the spring has decreased, the solid line moves toward the left (broken line Y), and the dead zone DZ in the flow rate control valve similarly moves. The flow rate characteristics vary irrespective of the presence of the dead zone. If the flow rate characteristics vary, the flow rate varies despite the amount of the electric current is maintained the same. As a result, the rate of connection of the clutch cannot be quickly and correctly brought to the target value, and the shift shock occurs.

The present invention solves the above-mentioned problem that occurs due to secular changes and the like in the flow rate control valve used in the clutch control device by using a simple means.

Means for Solving the Problem

In view of the above problem, the present invention provides a clutch control device that uses a flow rate control valve, wherein a flow rate control valve control device is provided with a learning device that learns the central point at the neutral position of the flow rate control valve, and a difference in the flow rate characteristics is compensated in order to correctly control the rate of connection of the clutch by using a simple means despite the flow rate control valve includes an dead zone. Namely, the present invention is concerned with a clutch control device in a power transmission device for vehicle having a clutch installed between an engine and a transmission, wherein:

the clutch control device includes a clutch actuator driven by a working fluid, a stroke sensor for detecting the movement of the clutch actuator, a flow rate control valve for controlling the amount of the working fluid in the clutch actuator, and a flow rate control valve control device for controlling the position of a valve body of the flow rate control valve responsive to a detection signal from the stroke sensor;

the flow rate control valve is connected to a communication passage communicated with the clutch actuator, to a pressure source passage communicated with a working fluid pressure source, and to a discharge passage for discharging the working fluid from the clutch actuator, and is provided with a valve actuator for operating the valve body, and, at the neutral position of the valve body, the communication flow passage is cut off from the pressure source passage and the discharge passage; and the flow rate control valve control device is provided with a neutral position learning device for learning the central point of the valve body at its neutral position, and the neutral position learning device executes the operation for increasing the movement of the clutch actuator after the movement thereof is decreased, detects a first operation amount which is the operation amount of the valve actuator at a moment when a rate of change in the detection signal of the stroke sensor has reached a predetermined value while the detection signal of the stroke sensor is decreasing, detects a second operation amount which is the amount of the valve actuator at a moment when the rate of change in the detection signal of the stroke sensor has reached a rate of change of which the absolute value is equal to the above predetermined value while it is increasing, and decides a value obtained by averaging the first operation amount and the second operation amount to be the central point at the neutral position.

Here, the "operation amount" stands for an amount that is added by operating the valve actuator in order to vary the flow rate which is the control amount. The operation amount can be the amount of the electric current if the valve actuator is an electromagnetic solenoid and can be the number of pulses if a pulse motor is used as the valve actuator.

As described in claim 2, the neutral position learning device can be so constituted as to increase the movement of the clutch actuator up to a position where the clutch is completely disconnected prior to executing the operation for increasing the movement of the clutch actuator after the movement thereof is decreased.

As described in claim 3, when the vehicle is at a halt and the brake of the vehicle is being applied, it is desired that the neutral position learning device renders the transmission to be neutral and executes the above operation to increase the movement of the clutch actuator after the movement thereof is decreased.

As described in claim 4, the flow rate control valve is provided with an electromagnetic solenoid for driving the valve body, and the operation amount is the amount of electric current that flows into a coil of the electromagnetic solenoid upon being controlled by the flow rate control valve control device.

Effects of the Invention

When the single flow rate control valve is provided in the clutch control device and the working fluid is fed into, or discharged from, the clutch actuator through the flow rate control valve, the valve body in the flow rate control valve is displaced to one side from the neutral position to feed the working fluid, and is displaced to the other side to discharge the working fluid. The flow rate control valve control device of the present invention is provided with the learning device for learning the neutral position, and learns, at all times, the operation amount of the valve actuator that becomes the central point at the neutral position of the flow rate control valve in which the neutral position has a width and includes an dead zone (e.g., leans the amount of electric current flowing into the coil of the electromagnetic solenoid). Even if the central point changes at the neutral position due to a difference inherent in the individual flow rate control valves or due to secular change, the amount of operating the valve actuator is adjusted relying upon the central point stored in the learning device, and the position of the valve body in the flow rate control valve is correctly controlled as to attain a target flow rate. It is, therefore, made possible to quickly and correctly change the rate of connection of the clutch at the time of gear shifting and to attain a clutch control without shift shock. In the case of a flow rate control valve without dead zone at the neutral position, the central point at the neutral position becomes the neutral position itself. It is, therefore, obvious that upon learning the neutral position, the amount of operating the valve actuator can similarly be adjusted even in the flow rate control valve without dead zone.

Further, the neutral position learning device of the present invention executes the operation for increasing the movement of the clutch actuator after the movement thereof is decreased, detects a first operation amount which is the operation amount of the valve actuator at a moment when a rate of change in the detection signal of the stroke sensor has reached a predetermined value while the detection signal of the stroke sensor is decreasing, and detects a second operation amount which is the operation amount of the valve actuator at a moment when the rate of change in the detection signal of the stroke sensor has reached a rate of change of which the absolute value is equal to the above predetermined value while it is increasing. In other words, the learning device detects the first operation amount at a moment when the rate has reached a predetermined value (−) while the movement of the clutch actuator is decreasing and the second operation amount at a moment when the rate has reached a predetermined value (+) of the same absolute value while the movement thereof is increasing. A value obtained by averaging the first operation amount and the second operation amount is decided to be the central point at the neutral position. This makes it possible to detect the central point at the neutral position on account of the reasons described below.

As shown in FIG. 11, the flow rate characteristics representing a relationship between the operation amount of the flow rate control valve (amount of electric current) and the flow rate are symmetrical on the feed side and on the discharge side with the neutral position or the central point as a point of symmetry. The characteristics of point symmetry remain the same as shown in FIG. 12 despite the central point at the neutral position changes due to secular change. The rate of change in the stroke of the clutch actuator varies in proportion to the flow rate of the flow rate control valve. If the flow rate on the feed side is equal to the flow rate on the discharge side, therefore, the rates of change in the stroke are opposite but have the same absolute value. Therefore, the neutral position learning device of the present invention finds an operation amount at the central point at the neutral position by deciding the central point at the neutral position by averaging the operation amount of the valve actuator at a moment when a predetermined value is reached while the stroke is decreasing, e.g., averaging the amount of electric current In that corresponds to the flow rate $-Q_0$ in FIG. 11 and the operation amount of the valve actuator at a moment when the rate of change is reached of which the absolute value is equal to that of the above predetermined value while the stroke is increasing, e.g., the amount of electric current Ip that corresponds to the flow rate $+Q_0$ in FIG. 11.

The stroke sensor used in the learning device of the present invention is a part that has primarily been provided for the clutch control device for controlling the rate of connection of the clutch. Therefore, the learning device of the present invention is capable of learning the central point at the neutral position without the need of providing any particular part. Further, the learning is executed while the stroke of the clutch actuator is changing without affected by static friction, and there is no decrease in the accuracy of learning. Besides, since the clutch control device uses only one flow rate control valve, the control device as a whole can be simply constituted in a compact size.

In the invention of claim 2, the neutral position learning device works to increase the movement of the clutch actuator up to a position where the clutch is completely disconnected, i.e., executes the learning by increasing the stroke to near its maximum value prior to executing the operation for increasing the movement of the clutch actuator after the movement thereof is decreased. That is, the learning device of the present invention learns the central point at the neutral position by increasing and decreasing the stroke of the clutch actuator, and is capable of executing the learning even when the stroke is at an intermediate position at the time of learning. Here, if the stroke is increased to near its maximum value prior to executing the learning, the clutch actuator once moves over its full stroke. Therefore, the learning is executed in a region where the clutch actuator stably operates, and the accuracy of learning is improved.

In the invention of claim 3, the neutral position is learned with the transmission being rendered to be neutral when the vehicle is at a halt and the brake of the vehicle is being applied. Upon executing the neutral position learning of the present invention, the rate of connection of the clutch varies accompanying an increase or a decrease in the stroke of the clutch actuator. It is, therefore, desired to execute the learning with the transmission being rendered to be neutral while the vehicle is at a halt so will not to affect the power transmission system of the vehicle. Upon executing the learning while the brake of the vehicle is being applied, the occurrence of unexpected start of the vehicle is prevented even in case erroneous operation happens to occur, and the neutral position can be learned maintaining safety.

The clutch control devices, in many cases, are provided with a half-engage clutch learning device, i.e., a device for learning, at regular intervals, a change in the stroke at a half-engage clutch position caused by wear of the clutch friction disk due to aging. The state of half-engage clutch is learned by executing the same operation as that of the present invention of claim 3 while the vehicle is at a halt. The clutch control device equipped with the half-engage clutch learning device is capable of learning the neutral position of the flow rate control valve simultaneously with learning the state of half-engage clutch.

In the invention of claim 4, there is used, as a flow rate control valve, a proportional control valve that is driven by an electromagnetic solenoid, i.e., there is used a flow rate control valve which continuously varies the position of the valve body by controlling the electric current that flows into the coil of the electromagnetic solenoid by using a flow rate control valve control device. In this case, use of an electric control device makes it possible to realize the drive device and the control device of the flow rate control valve in small sizes.

BRIEF DESCRIPTION OF THE DRAWINGS

[FIG. 7] is a diagram illustrating an embodiment of controlling the stroke of the clutch at the time of gear shifting.

BEST MODE FOR CARRYING OUT THE PRESENT INVENTION

Figure 6:
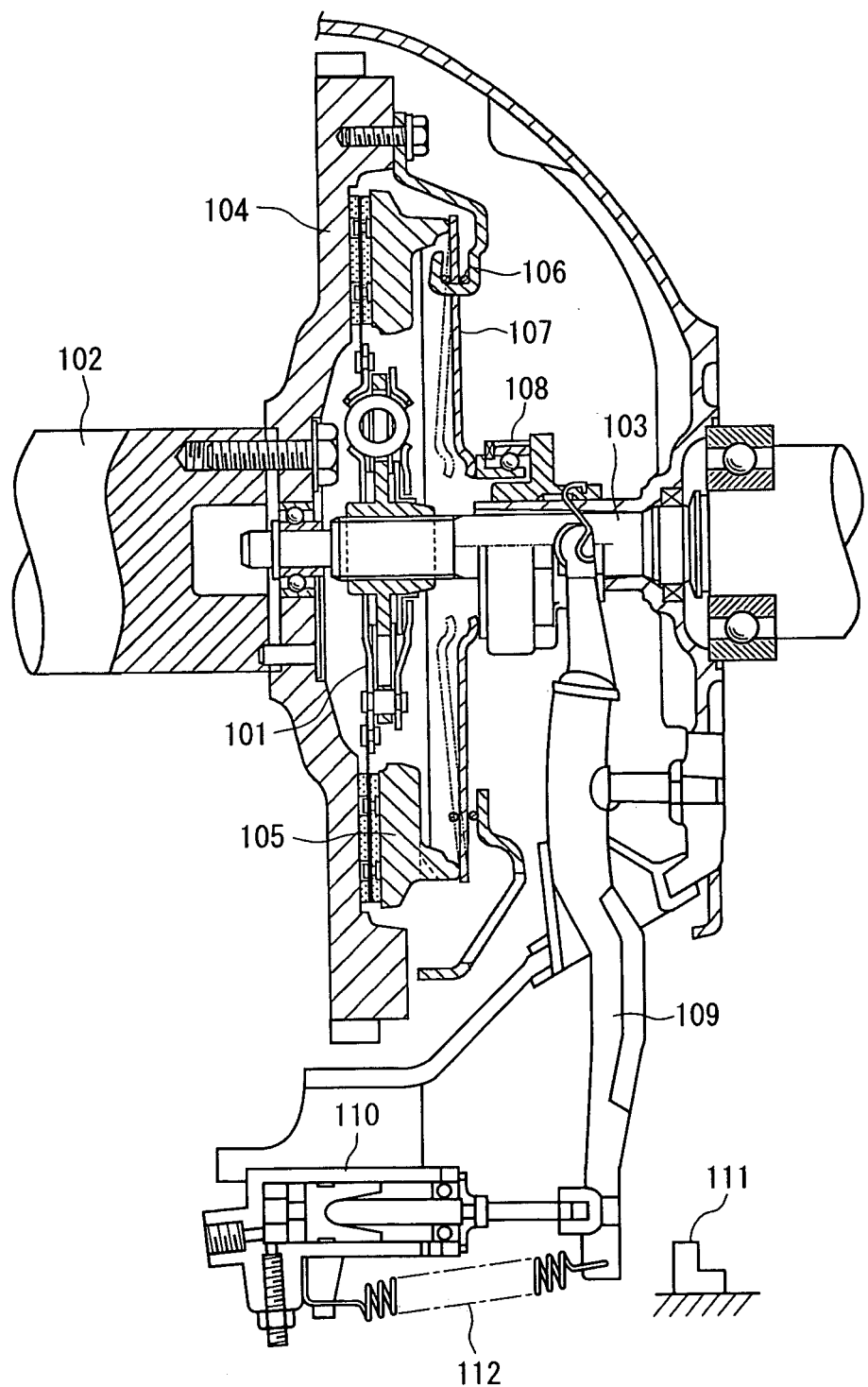
[FIG. 6] is a view showing the constitution of a clutch for a vehicle.

A clutch control device for vehicles embodying the present invention will now be described with reference to the drawings. However, the clutch for vehicles and equipment constituting the clutch control device to which the present invention is applied, are not particularly different from the conventional devices shown in FIG. 6 and other drawings. That is, the clutch for vehicles operated by the clutch control device of the present invention is basically the same as the clutch of FIG. 6, and is equipped with a clutch actuator 110 for varying the rate of connection of the clutch. A working fluid is fed to the clutch actuator 110 from a fluid pressure source, the rate of connection of the clutch is determined by the movement of a piston in the clutch actuator 110, and a maximum value of the movement is mechanically limited by a stopper 111.

Figure 1:
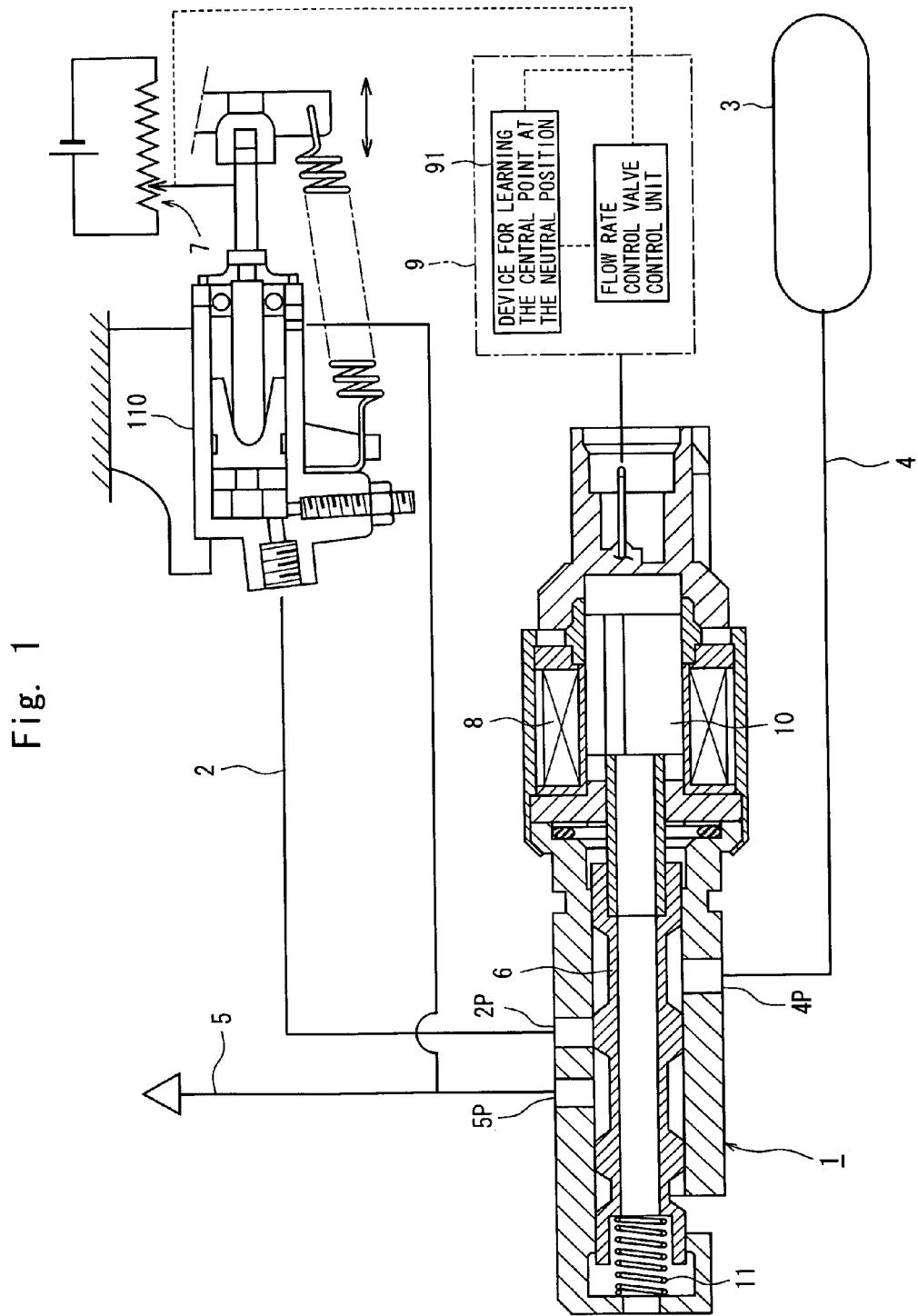
[FIG. 1] is a circuit diagram of a clutch control device equipped with a learning device of the present invention.
Figure 8:
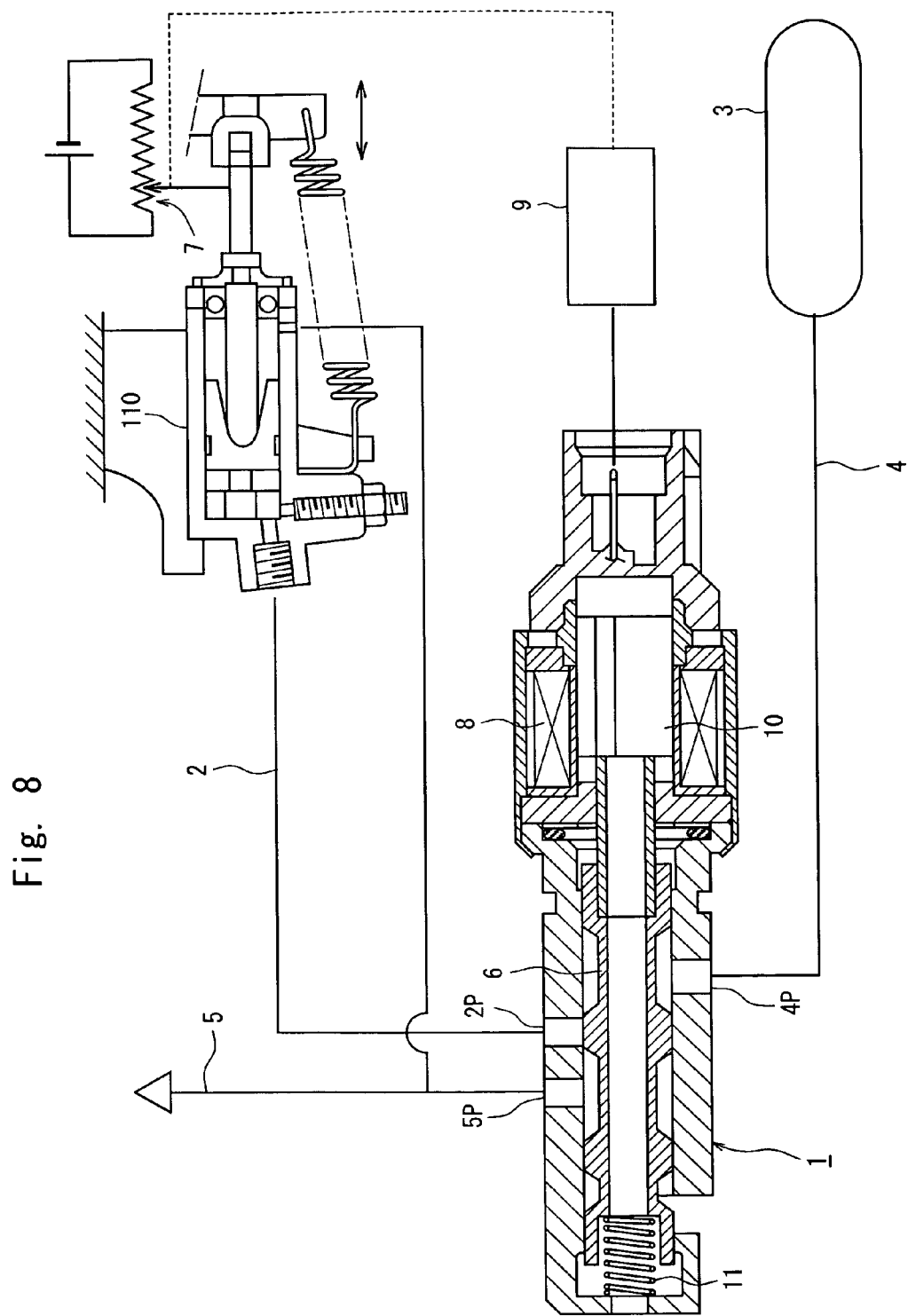
[FIG. 8] is a circuit diagram of a conventional clutch control device.
Figure 9:
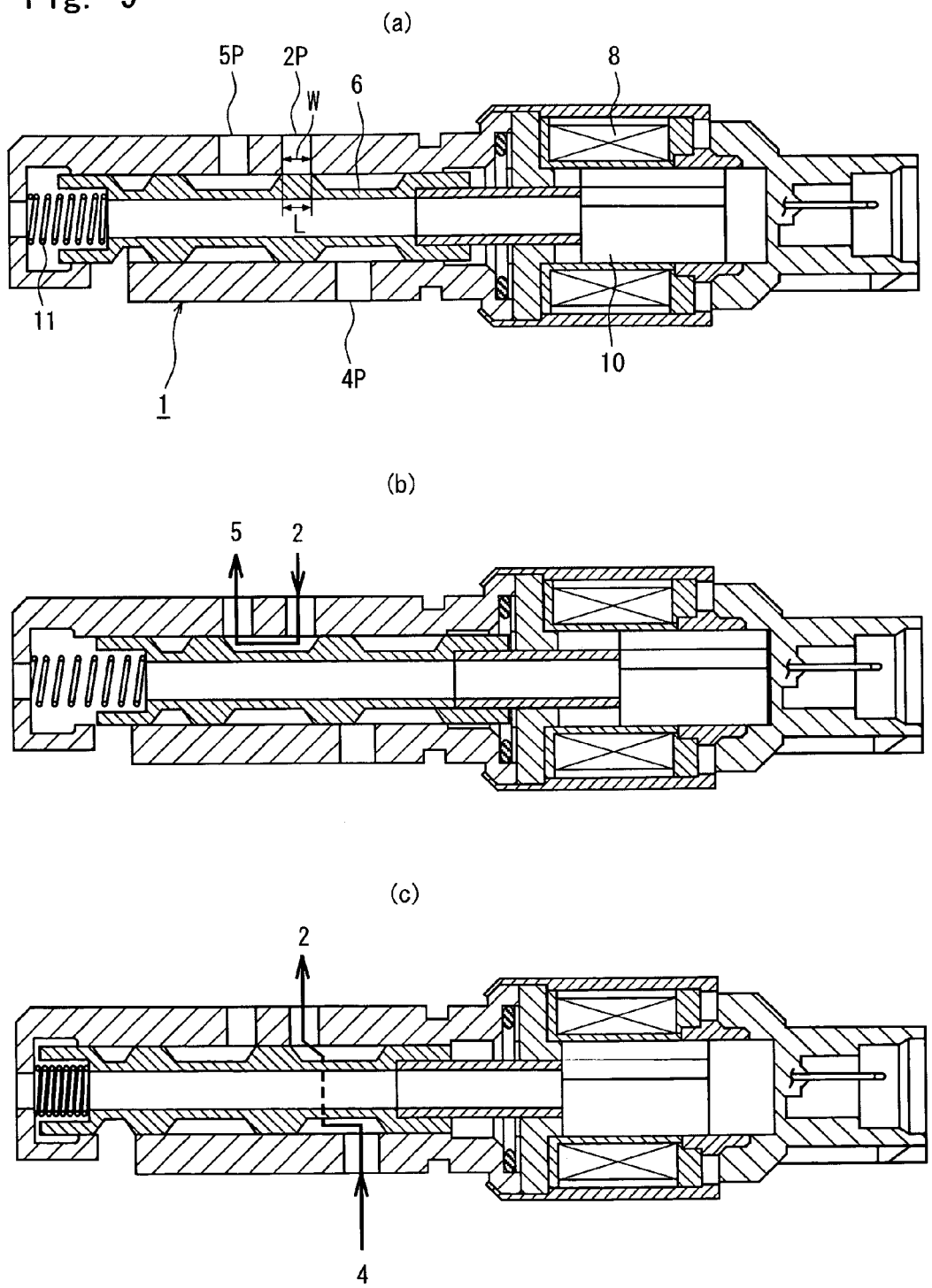
[FIG. 9] is a view closely illustrating the operation of a flow rate control valve in the clutch control device.

FIG. 1 shows a hydraulic circuit constitution of the clutch control device of the present invention. Equipment constituting the circuit of FIG. 1 are the same as those of the conventional counterparts of FIG. 8 with regard to the so-called hardware, and the corresponding parts are denoted by the same reference numerals. The clutch control device includes a single flow rate control valve 1 driven by an electromagnetic solenoid, the flow rate control valve 1 being connected to a fluid pressure source 3 such as an air tank, to a clutch actuator 110 and to a discharge passage 5. A flow rate control valve control device 9 controls the amount of electric current flowing into a coil 8 of the electromagnetic solenoid which is a valve actuator to vary the position of a valve body 6, and varies the rate of connection of the clutch by feeding and discharging the working fluid into, and from, the clutch actuator 110. The movement (stroke) of the piston in the clutch actuator 110 is detected by a stroke sensor 7 and its signal is input to the flow rate control valve control device 9.

In the clutch control device of the present invention, the flow rate control valve control device 9 is equipped with a device 91 for learning the central point at the neutral position. By using a signal of a stroke of the clutch actuator 110, the device 91 for learning the central point at the neutral position learns the amount of electric current flowing into the coil 8, that corresponds to the central point at the neutral position of the valve body at which the flow of the working fluid through the flow rate control valve 1 is cut off in order that the neutral position can be learned even when an dead zone is present in the flow rate control valve 1. The device for learning the central point at the neutral position, too, receives the detection signal from the stroke sensor 7.

The device 91 for learning the central point at the neutral position executes the operation for increasing the stroke of the clutch actuator 110 after the stroke thereof is decreased, and detects a first operation amount at a moment when a rate of change has reached a predetermined value while the stroke is decreasing and a second operation amount at a moment when the rate of change has reached a value of which the absolute value is equal to the above predetermined value while the stroke increasing. When the stroke is increased and decreased in executing the learning, the rate of connection of the clutch varies causing a variation in the engine power that is transmitted to the power transmission system of the vehicle.

To avoid such an occurrence, the device 91 for learning the central point at the neutral position of this embodiment renders the transmission to be neutral for a short period of time when the vehicle is at a halt, and executes the learning by operating the clutch actuator 110. Prior to executing the learning by increasing and decreasing the stroke of the clutch actuator 110, further, the stroke is increased to near its maximum value that corresponds to the position where the clutch is completely disconnected, placed in a halted state and, thereafter, the learning is executed.

Figure 2:
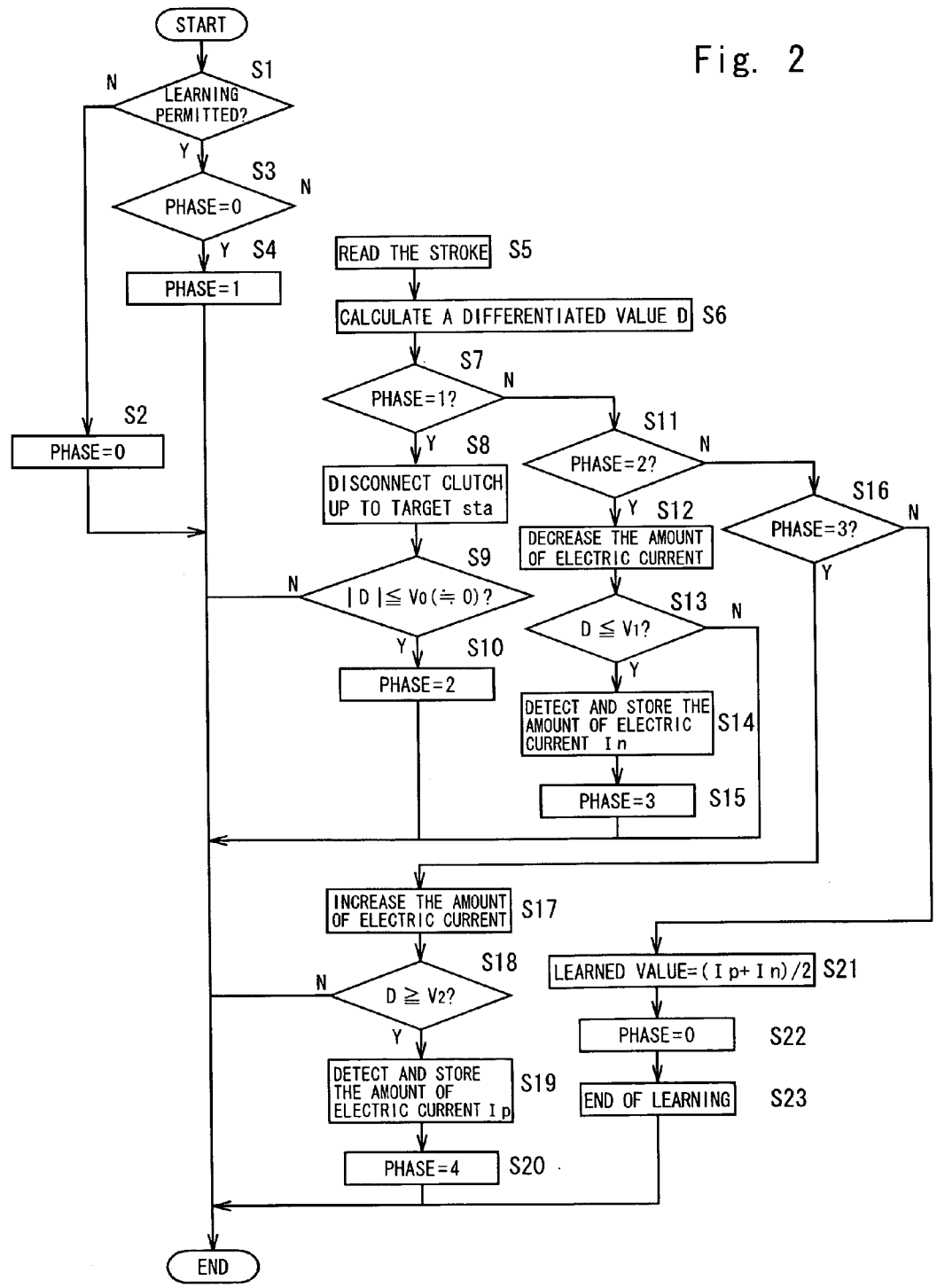
[FIG. 2] is a diagram illustrating the operation of the learning device of the present invention.

The operation of the device 91 for learning the central point at the neutral position will be described with reference to a flowchart of FIG. 2 and a diagram of operation characteristics of FIG. 3. The learning device of this embodiment executes the learning in a manner of being divided into procedures of four steps (phases), and executes the operation of the flowchart of FIG. 2 in a predetermined operation period. Therefore, the amount of electric current flowing into the coil 8 of the electromagnetic solenoid varies according to a pattern shown on the lower side in FIG. 3, and the stroke of the clutch varies depending upon the amount of the electric current as shown on the upper side in FIG. 3.

At step S1 in the flowchart of FIG. 2, first, it is decided if the learning conditions that will be described below are holding. If the learning conditions are not holding, the state where the clutch is connected (state of clutch other than the time of learning: phase 0) is maintained at step S2. If the learning conditions are holding, the phase 0 is shifted to a phase 1 at steps S3 and S4. If the phase 0 is shifted to another phase, the stroke of the clutch actuator 110 is read (S5) and a differentiated value D is calculated (S6). The differentiated value D represents a rate of change in the stroke. During the execution of learning, a rate of change in the stroke is calculated at all times.

Figure 10:
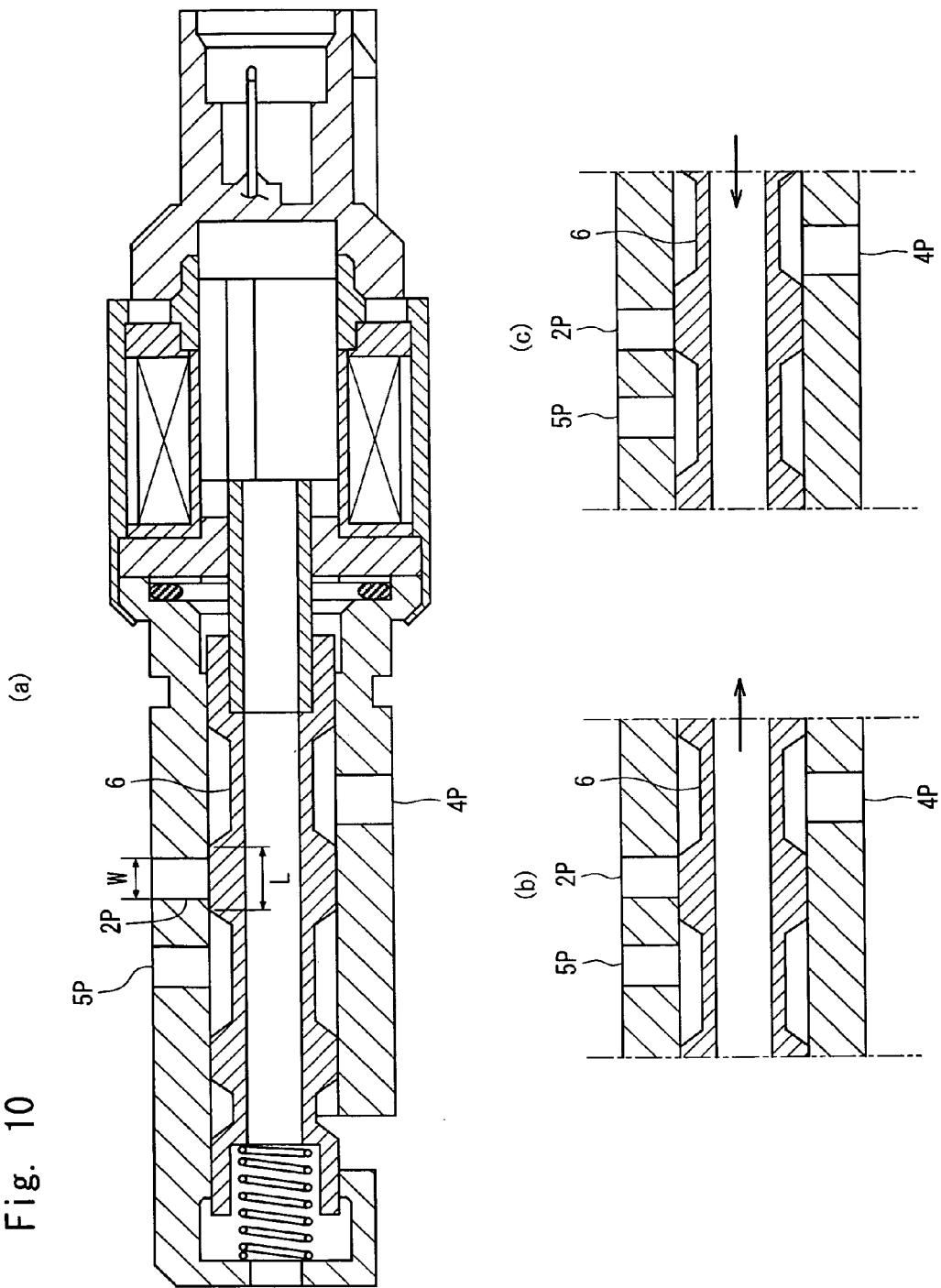
[FIG. 10] is a view closely illustrating the operation of a flow rate control valve in which an dead zone is present.

If it is decided at step S7 that the phase is the phase 1, the stroke is so controlled that the position at where the clutch is completely disconnected becomes a target stroke sta (S8). In the step of control, the rate of change in the clutch stroke operated at step S6 is great at first but decreases as the target stroke sta is approached. At a moment when the stroke approaches near the target stroke sta and the rate of change becomes a predetermined rate $V_0$ for starting the learning, which is nearly 0 (S9), the phase 1 is finished and is shifted to a phase 2 (S10). The moment at which the phase 1 is finished is a moment at which the flow rate of the working fluid fed to the clutch actuator 110 becomes 0 to disconnect the clutch, and the flow rate control valve 1 is in a state of FIG. 10(*b*) (point P in the flow rate characteristics of FIG. 11).

Here, since the clutch is quickly disconnected at the time of learning, it often happens that the movement of the clutch actuator goes up to a stroke limit (stM) limited by a stopper 111 passing over the position of complete disconnection before the rate of change in the stroke becomes 0. To make sure that the clutch is at the completely disconnected position, a step may be added after the step S9 to decide if the stroke is less than stM but is more than a predetermined stroke, and the phase may be shifted to the phase 2 if the above condition is satisfied.

Figure 3:
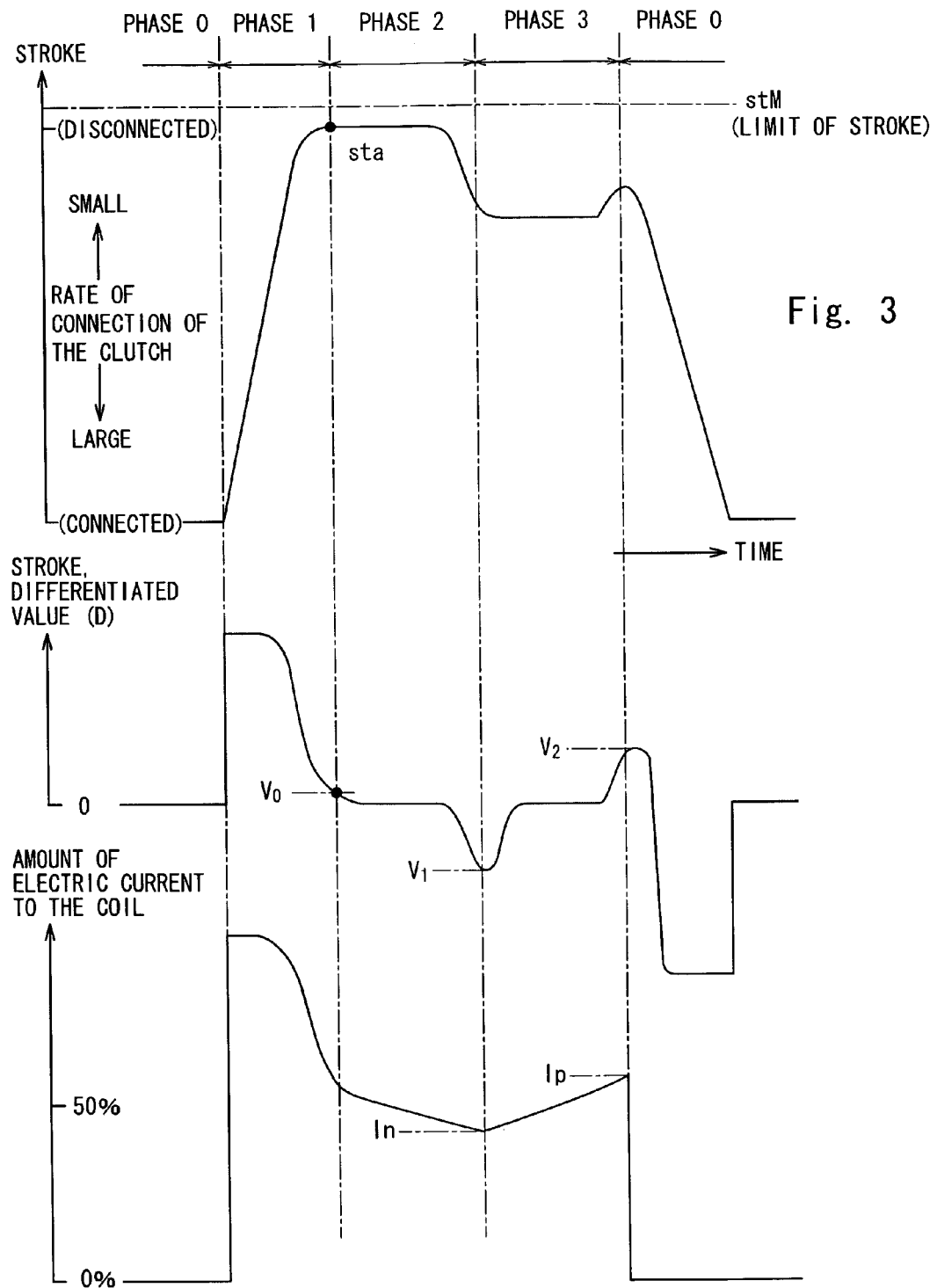
[FIG. 3] is a basic flowchart of a device for learning the central point at the neutral position according to the present invention.

If it is decided at step S11 that the phase is phase 2, the routine proceeds to step S12 where the device 91 for learning the central point at the neutral position gradually decreases the amount of electric current flowing into the coil at a predetermined rate in order to decrease the stroke of the clutch actuator 110 (see the portion of PHASE 2 in the characteristics of electric current to the coil in FIG. 3). Then the valve body 6 in the flow rate control valve 1 moves rightward in FIG. 10(*b*). Here, at first, the valve body 6 passes through the dead zone DZ. Therefore, the stroke is maintained at the target stroke sta and the rate of change thereof is 0. After having passed over the dead zone DZ, the working fluid is discharged from the clutch actuator 110 and the stroke decreases. At a moment when the rate of change operated at step S6 has reached a predetermined negative value $V_1$ (flow rate through the flow rate control valve 1 corresponds to, for example $-Q_0$ in FIG. 11) (S13), the amount of electric current In flowing into the coil at that moment is detected and stored as a first operation amount (S14), and the phase 2 is finished and is shifted to a phase 3 (S15).

If it is decided at step S16 that the phase is the phase 3, the routine proceeds to step S17 where the amount of electric current to the coil is gradually increased at a predetermined rate (see the portion of PHASE 3 in the characteristics of electric current to the coil in FIG. 3). In this case, the valve body 6 in the flow rate control valve 1 moves leftward. When the state of FIG. 10(*c*) is assumed (point N in the flow rate characteristics in FIG. 11), the rate of change becomes 0 again, and the stroke becomes constant. As the valve body 6 further moves passing over the dead zone DZ, the working fluid is fed to the actuator 110 to increase the stroke. At a moment when the rate of change reaches a predetermined positive value $V_2$ (flow rate through the flow rate control valve 1 corresponds to, for example, $+Q_0$ in FIG. 11) of which the absolute value is equal to that of the above predetermined value $V_1$ (S18), the amount of electric current Ip flowing into the coil at that moment is detected and is stored as a second operation amount (S19). Upon detecting the first operation amount In and the second operation amount Ip as described above, the stroke control for learning is finished, and the phase is shifted to a phase 4 for operating the central point at the neutral position (S20).

When the phase is shifted to the phase 4, the decisions at steps S7, S11 and S16 have all been negated, and the routine proceeds to step S21 where the stored first operation amount In and the second operation amount Ip are averaged to operate the amount of electric current Ic=(In+Ip)/2 at the central point at the neutral position, which is then stored as a learned value. Further, the phase is returned back to the phase 0 (S22) and the flag of end of learning is raised (S23) to end the routine.

By using the amount of electric current at the central point at the neutral position learned as described above, the device 91 for learning the central point at the neutral position adjusts the past value of learning. The flow rate control valve control device 9 uses the updated value of learning to control the flow rate control valve 1. According to the present invention, since the central point at the neutral position is learned, errors in the flow rate characteristics caused by secular change or the like can be compensated despite the flow rate control valve 1 has a width at the neutral position and includes an dead zone in the flow rate characteristics thereof.

Figure 4:
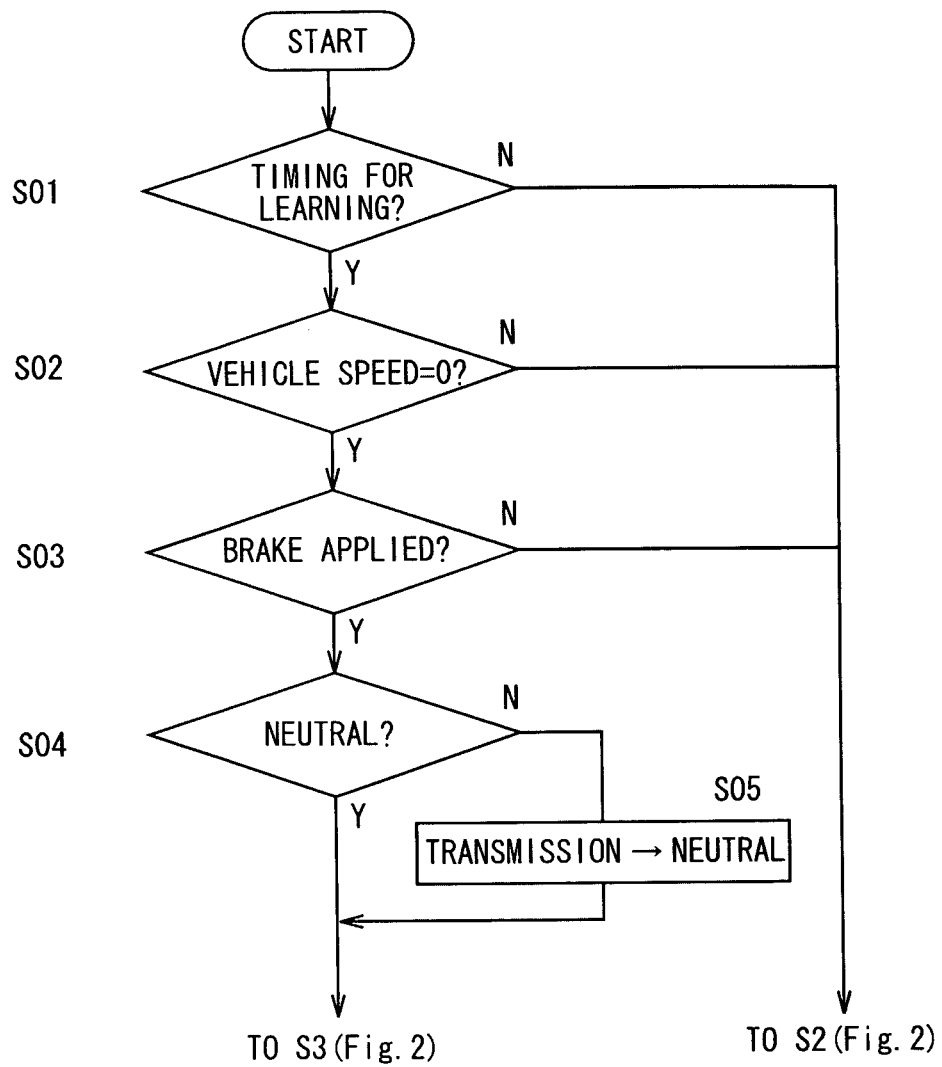
[FIG. 4] is a flowchart illustrating the learning holding conditions according to an embodiment of the present invention.

Decision of if the learning conditions are holding at step S1 in the flowchart of FIG. 2 will be described below with reference to a flowchart of FIG. 4.

As the control routine starts, it is decided at step S01 if it is the timing for learning the neutral position. When the timing for learning has arrived, it is decided at step S02 if the vehicle is at a halt (vehicle speed=0) and, next, at step S03 if the brake of the vehicle is being applied. If either one of these decisions is negative, the routine proceeds to step S2 in FIG. 2. If these decisions are all Yes, the routine proceeds to step S04 where it is decided if the transmission is neutral. If not neutral, the transmission is rendered to be neutral (S05), and the routine proceeds to step S3 in FIG. 2. Thus, the neutral position is learned in the neutral state where no power is transmitted from the engine to the wheels. Therefore, the motion of the vehicle is not affected despite the stroke of the clutch is varied. Further, the brake of the vehicle is being applied during the learning and it does not happen that the vehicle starts moving unexpectedly. Therefore, the neutral position can be safely learned. The learning in the neutral state is completed in a short period of time, and traveling of the vehicle is not hindered.

Here, the clutch control device is, usually, provided with a device for learning half-engage clutch to learn, at regular intervals, a change in the stroke at the half-engage clutch position caused by wear of a clutch friction plate due to aging. The state of half-engage clutch is learned by connecting and disconnecting the clutch when there hold the learning conditions similar to those in the flowchart of FIG. 4. Therefore, learning the neutral position by the flowchart of FIG. 4 can be executed simultaneously with learning the state of half-engage clutch.

Figure 5:
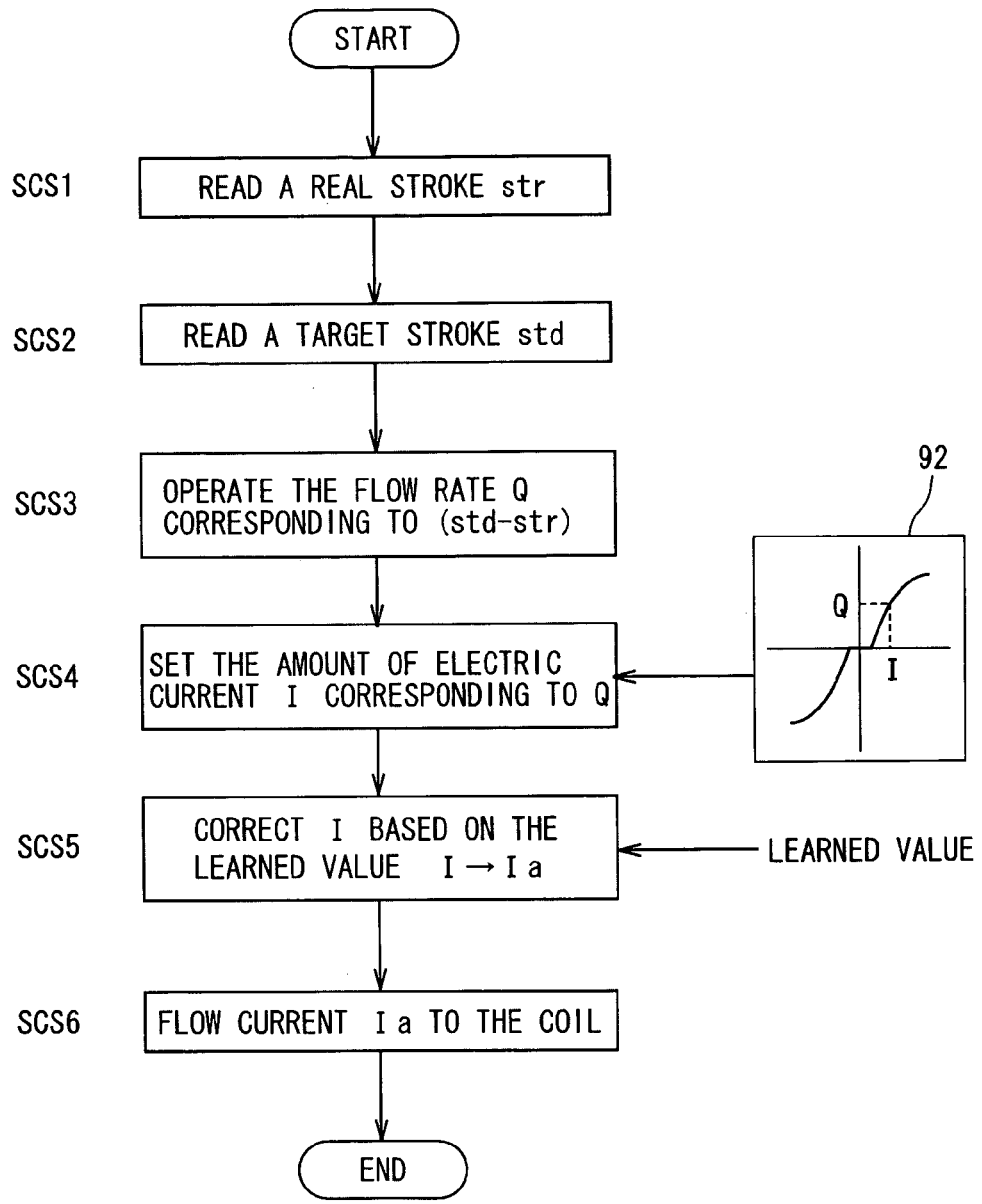
[FIG. 5] is a flowchart of a stroke control in the clutch control device of the present invention.

FIG. 5 shows a flowchart for executing the stroke control of the clutch actuator at the time of gear shifting while the vehicle is traveling by using the flow rate control valve control device equipped with the device for learning the central point at the neutral position according to the present invention.

In operating the clutch for gear shifting, the stroke (rate of connection of the clutch) is controlled so as to vary according to the pattern of FIG. 7 with the passage of time. The stroke control starts at a moment when a shift-change signal is generated from a shift lever or the like and at step SCS1, a real stroke str which is a detection signal of the stroke sensor 7 is read. At SCS2, the stroke after a predetermined period of time has passed is set as a target stroke std. At SCS3, the flow rate Q of the flow rate control valve 1 is operated depending upon a difference between the target stroke std and the real stroke str so as to attain the target stroke std after the passage of the predetermined period of time.

Figure 11:
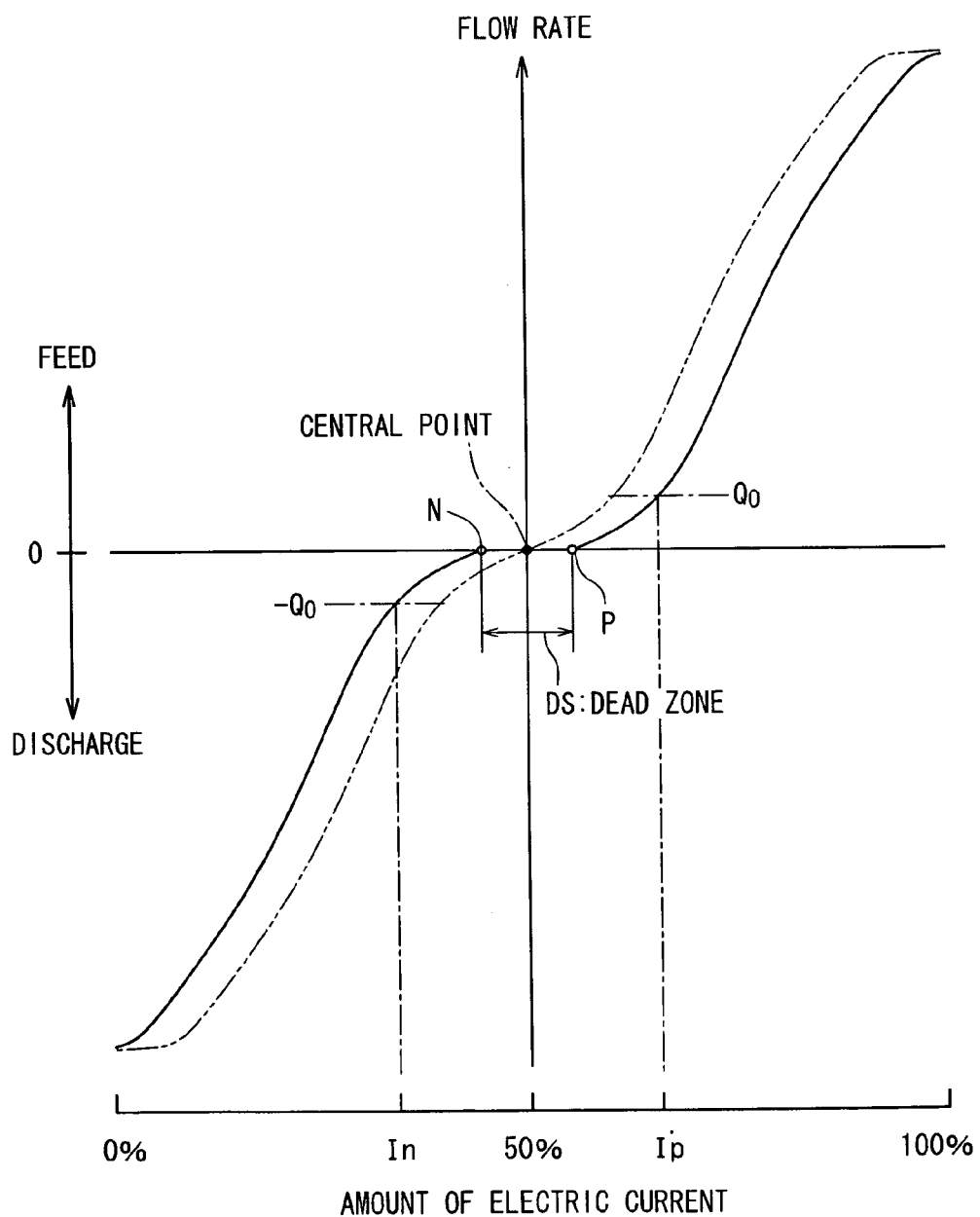
[FIG. 11] is a diagram illustrating flow rate characteristics of the flow rate control valve.

The flow rate control valve control device 9 is storing a relationship between the flow rate and the amount of electric current to the coil 8, i.e., storing the flow rate characteristics represented by the solid line in FIG. 11 in the form of a map 92. At SCS4, the amount of the electric current I corresponding to the flow rate Q is determined by using the map 92. The flow rate control valve control device 9, on the other hand, is storing the amount of the electric current at the central point at the neutral position learned by the device 91 for learning the central point at the neutral position. At SCS5, the amount of the electric current I is adjusted based on a difference between the amount of the electric current at the central point at the neutral position in the map 92 and the learned value. At SC6, a adjusted amount of electric current Ia is fed to the coil 8 of the electromagnetic solenoid. As a result, the valve body 6 in the flow rate control valve 1 assumes a position adjusted by the learned value, and can be correctly corresponded to the required flow rate Q.

Figure 12:
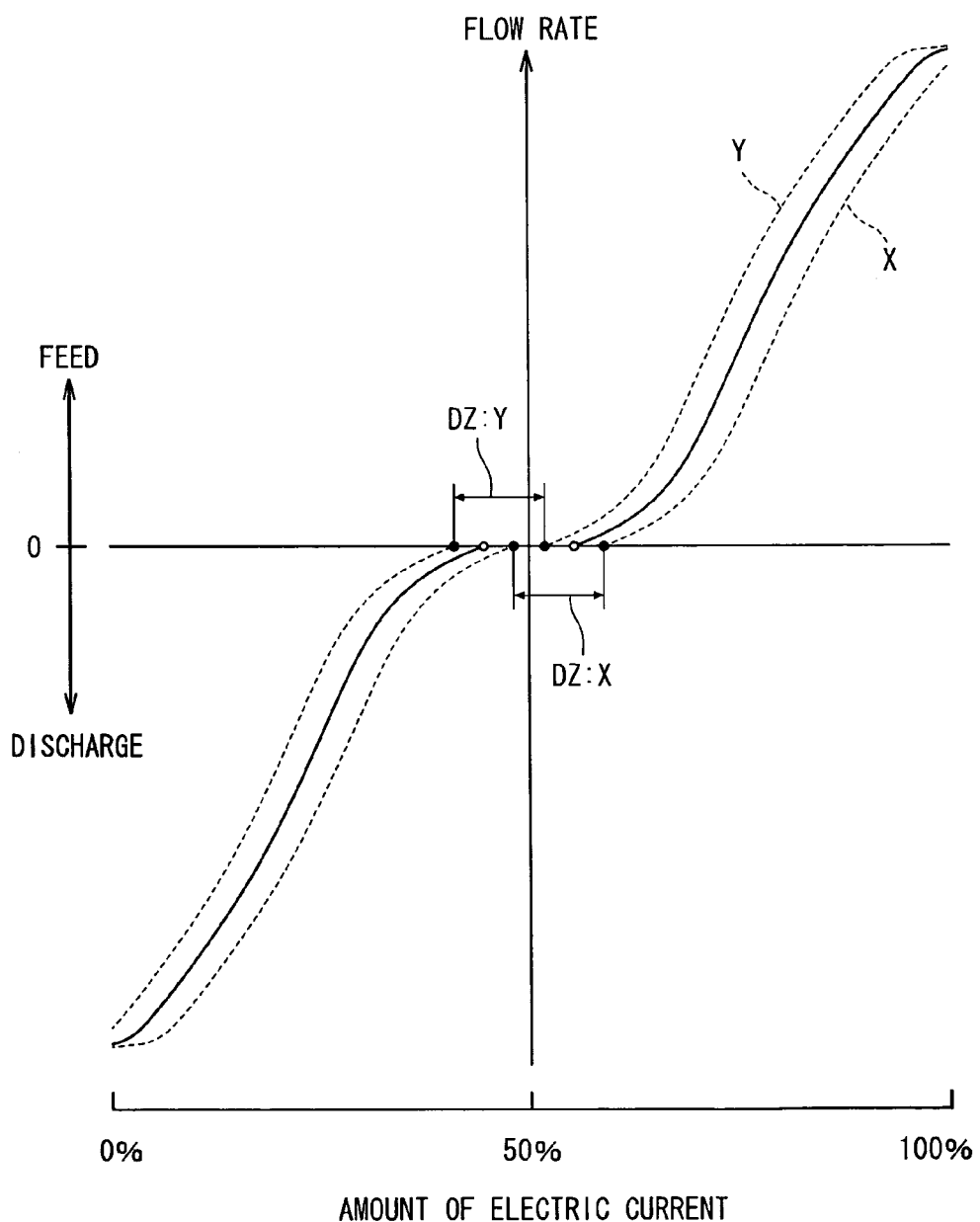
[FIG. 12] is a diagram showing changes in the flow rate characteristics.

In this flowchart, the amount of electric current determined by the map 92 of flow rate characteristics is adjusted by using the learned value. The amount of electric current, however, may be adjusted by varying the flow rate characteristics of the map 92 based on the learned value as represented by broken lines in FIG. 12.

Industrial Applicability:

According to the present invention as described above in detail, the clutch control device that uses a single flow rate control valve is provided with a learning device for learning the central point of the flow rate control valve at its neutral position to compensate for a difference in the flow rate characteristics, and the rate of connection of the clutch can be correctly controlled even by using the flow rate control valve that includes an dead zone. Therefore, the present invention can be industrially utilized as a clutch control device for vehicles being equipped with the clutch actuator that is driven by the pneumatic pressure or the hydraulic pressure.

Though the above embodiment has described the case of using the electromagnetic solenoid as the valve actuator and controlling the flow rate control valve by varying the amount of electric current to the coil, it is also allowable to use a pulse motor as the valve actuator. In this case, the number of pulses for driving the pulse motor becomes the amount of operation. As the valve actuator, there may be used a hydraulic cylinder as described in the patent document 1. It will thus be obvious that the present invention can be put into practice in a variety of other ways in addition to the above-mentioned embodiment.

Description of Reference Numerals:
1 flow rate control valve
2 communication passage
4 pressure source passage
5 discharge passage
6 valve body
7 stroke sensor
8 coil
9 flow rate control valve control device
91 device for learning the central point at the neutral position
110 clutch actuator
111 stopper

The invention claimed is:

1. A clutch control device for controlling a clutch installed between an engine and a transmission in a power transmission device for a vehicle, said clutch control device comprising:

a clutch actuator driven by a working fluid;

a stroke sensor for detecting a movement of said clutch actuator;

a flow rate control valve for controlling an amount of the working fluid in said clutch actuator; and a flow rate control valve control device for controlling a position of a valve body of said flow rate control valve responsive to a detection signal from said stroke sensor, wherein said flow rate control valve is connected to a communication passage communicated with said clutch actuator, to a pressure source passage communicated with a working fluid pressure source, and to a discharge passage for discharging the working fluid from said clutch actuator, and said flow rate control valve is provided with a valve actuator for operating said valve body, such that at a neutral position of said valve body, said communication flow passage is cut off from said pressure source passage and said discharge passage, wherein said flow rate control valve control device is provided with a neutral position learning device for learning a central point of said valve body at the neutral position, wherein said neutral position learning device, at a time of learning said central point at the neutral position, executes an operation for decreasing the movement of the clutch actuator, and thereafter, executes an operation for increasing the movement of the clutch actuator, such that said neutral position learning device executes said learning said central point at the neutral position while the movement of the clutch actuator is changing, wherein said neutral position learning device, while decreasing the movement of the clutch actuator, detects, as a first operation amount, an operation amount of said valve actuator at a moment when a rate of change in the movement of the clutch actuator detected by said stroke sensor has reached a negative predetermined value, then, said neutral position learning device, while increasing the movement of the clutch actuator, detects, as a second operation amount, an operation amount of said valve actuator at a moment when a rate of change in the movement of the clutch actuator has reached a rate of change which is equal to an absolute value of said negative predetermined value, and wherein said neutral position learning device decides a value obtained by averaging said first operation amount and said second operation amount to be the central point at the neutral position.

2. The clutch control device according to claim 1, wherein said neutral position learning device increases the movement of the clutch actuator up to a position where the clutch is completely disconnected prior to executing said operation for decreasing the movement of the clutch actuator at the time of learning said central point at the neutral position.

3. The clutch control device according to claim 1, wherein, when the vehicle is at a halt and a brake of the vehicle is being applied, said neutral position learning device renders the transmission to be neutral and executes said operation to decrease the movement of the clutch actuator at the time of learning said central point at the neutral position.

4. The clutch control device according to claim 1, wherein said flow rate control valve is provided, as said valve actuator, with an electromagnetic solenoid for driving said valve body, and said operation amount is an amount of an electric current that flows into a coil of said electromagnetic solenoid upon being controlled by said flow rate control valve control device.

5. The clutch control device according to claim 1, wherein the movement of the clutch actuator is a stroke of the clutch actuator.

6. The clutch control device according to claim 1, wherein said neutral position learning device increases the movement of the clutch actuator prior to executing said operation at the time of learning said central point at the neutral position.

7. The clutch control device according to claim 1, wherein, when the vehicle is at a halt and a brake of the vehicle is applied, said neutral position learning device executes said operation to decrease the movement of the clutch actuator at the time of learning said central point at the neutral position.

8. The clutch control device according to claim 1, wherein said valve actuator comprises an electromagnetic solenoid for driving said valve body.

* * * * *